United States Patent Office 2,959,821
Patented Nov. 15, 1960

2,959,821

DIPPING PROCESS WHEREIN CROSS-LINKING AGENT IS APPLIED IN COAGULATING BATH

Günter Kolb, Koln-Stammheim, Germany, assignor to Farbenfabriken Bayer Aktiengesellschaft, Leverkusen, Germany, a corporation of Germany No Drawing. Filed Feb. 8, 1956, Ser. No. 564,141

Claims priority, application Germany Feb. 11, 1955

12 Claims. (Cl. 18—58.6)

The present invention relates to a process of producing moldings by dipping from polymers containing reactive groups and elasticizing components.

It is known to produce elastic moldings by dipping which comprises placing heated molds into emulsions of natural rubber or of butadiene-containing polymers, which contain vulcanizing agents, and vulcanizing the coatings thus obtained by treating them with sulfur and an accelerator in the heat.

In accordance with the invention it has been found that moldings of excellent properties are obtained by dipping molds into an emulsion or a solution of polymers containing free reactive groups and preferably at least one elasticizing component after pretreating the molds with a solution or coagulating bath of cross-linking agents which are capable of reacting with the reactive groups of the polymer with cross-linking, preferably in the presence of coagulating agents. The process of the invention is particularly suitable for producing elastic moldings.

Suitable polymers for producing elastic moldings consist essentially of linear carbon chains to which are linked from 0.005 to 0.6 mol by weight of reactive groups such as carbonyl-, carboxyl-, sulfonic acid, carbonamide or basic groups per 100 parts by weight of polymer.

These polymers may be obtained by copolymerizing monomers, which have polymerizable carbon-to-carbon double bonds and have an elasticizing action, with organic compounds which have reactive groups and are copolymerizable with said elasticizing monomers.

Suitable monomers which have polymerizable carbon-to-carbon double bonds and have an elasticizing action are for example acrylic acid esters or methacrylic acid esters of aliphatic alcohols with at least 4-C-atoms, preferably with 8–14 C-atoms, vinyl alkyl ethers, the alkyl radical of which contains 1–8 C-atoms, and compounds with two conjugate carbon-to-carbon double bonds, such as for example butadiene or homologues and derivatives of butadiene, such as isoprene, 2,3-dimethyl butadiene-1,3,2-chlorobutadiene-1,3, and 2-cyanobutadiene-1,3. The said monomers which have an elasticizing action are preferably applied in quantities amounting to about 15–99 percent by weight calculated on the total amount of monomers applied.

Suitable copolymerizable compounds with reactive groups are those which contain for example carbonyl, carboxyl, sulfonic acid, carbonamide or basic groups, preferably basic nitrogen groups, which are capable of salt formation with organic acids. Examples of polymerizable compounds containing carbonyl groups are: acrolein, α-substituted acroleins, such as α-methyl acrolein, and vinyl alkyl ketones, such as for example vinyl methyl ketone, vinyl ethyl ketone, isopropenyl methyl ketone. As polymerizable compounds with carboxyl groups, there may be mentioned both mono- and polycarboxylic α-β-ethylenically unsaturated acids, such as for example acrylic acid, methacrylic acid, sorbic acid, maleic acid, maleic acid anhydride or fumaric acid. It is also possible to use the mono-esters of the polycarboxylic acids, such as monoesters of maleic acid with aliphatic, cycloaliphatic and araliphatic alcohols having 1–14 carbon atoms as for instance maleic acid monomethylester, maleic acid monobutylester, maleic acid monododecyl ester, maleic acid monocyclohexylester. Examples of polymerizable compounds with carbonamide groups are: acrylamide, α-methacrylamide, α-isopropylacrylamide, α-chloroacrylamide. Heterocyclic nitrogen bases containing vinyl groups such as 2-vinyl pyridine and 2-vinyl-5-ethyl pyridine are examples of basic unsaturated compounds. Furthermore, vinylsulfonic acid may be used as a suitable copolymerizable compound. Said monomers with reactive groups may be applied in quantities amounting to about 0.5–50 percent by weight calculated on the total amount of monomers.

In addition to the said monomers, other organic compounds each containing at least one polymerizable carbon-to-carbon double bond may be used for the production of the copolymers, these compounds being for example styrene, acrylonitrile, methacrylonitrile, acrylic acid or methacrylic acid esters of alcohols with 1–3 C-atoms, vinyl chloride and, 1,1-dichloroethene.

Reference is also to be made to such copolymerizable compounds as have their reactive groups present in masked form, the said groups being liberated by reaction with a hydrolyzing agent after the polymerization: examples of such compounds are saponifiable esters, such as acrylic and methacrylic alkyl esters, vinylsulfonic alkylesters, (butylvinylsulfonate) unsaturated nitrile (acrylonitrile) or the unsaturated amides referred to above. In the production of moldings the copolymers are preferably used in the form of their emulsions. The latter are obtained by the monomers being emulsified according to known processes, preferably in an aqueous medium, and being polymerized in the presence of suitable catalysts or by emulsifying the polymer in water.

As examples of emulsifiers, there are to be mentioned the alkali salts of paraffin sulphonates obtained by sulphochlorination of long-chain paraffins with about 12–18 carbon atoms and subsequent saponification (see German Patent 750,330). The activation of the polymerization may be carried out with radical-forming substances, such as for example with azo dinitriles, per-compounds or with redox systems, under which are understood the combinations of compounds yielding oxygen and reducing compounds. Particular reference is to be made to the activation of the emulsion by aliphatic sulphinic acid salts, preferably with a carbon chain of about 12–18 carbon atoms, without addition of compounds yielding oxygen (Makromolekulare Chemie, volume 3, page 43 (1949)). It is also possible to influence the copolymers as regards their thermoplastic behaviour by adding so-called regulators Prior to working up copolymers of butadienes, it is of course advisable to add so-called stabilizers, such as for example phenyl-β-naphthylamine or suitable phenols. The copolymer emulsions may also be prepared by the monomers being polymerized in block form or in solution and subsequently emulsified. The emulsions contain preferably about 10–60 percent by weight of polymers. The polymers may furthermore be applied in dissolved form. Suitable solvents are aromatic hydrocarbons such as benzene, chlorobenzene, 2,4-dichlorobenzene, ketones, such as methylethylketone or mixtures of said solvents. The solution of the polymers in said solvents contain 8–40, preferably 10–20 percent by weight of polymers. The choice of the polyfunctional compounds which are to be reacted with the reactive groups of the copolymers is dependent on the nature of the reactive groups of the copolymers. Among the numerous combinations which are possible, the following are to be mentioned as examples in respect of copolymers containing carbonyl groups: Polyamines and polyamides containing at least two $NH_2$ groups, such as for example ethylene diamine, butylene diamine, hexamethylene diamine, nonamethylene diamine, diethylene triamine, triethylene tetra-mine, tetra-ethylene pentamine, hydrazine, urea, thiourea, oxalic acid diamide, succinic acid diamide, adipic acid diamide, and terephthalic acid diamide. In this case, the carbonyl group of the copolymers react with the amino or amide groups with formation of $=C=N-$linkages. For the copolymers containing acid groups, such as carboxyl and sulfonic acid groups, there may be considered polyamines containing at least two

groups, $R_1$ and $R_2$ standing for hydrogen, alkyl having 1-18 carbon atoms, aryl, such as phenyl, or aralkyl, such as benzyl, whereby $R_1$ and $R_2$ may stand for same or different substituents. Suitable polyamines are the said polyamines in which at least one hydrogen atom of one of the amino or imino groups is substituted by one of the aforementioned substituents, such as N-methylethylene diamine, N-N'-dimethylethylene diamine, N-N-N'-N'-tetramethylethylene diamine. Furthermore, water soluble salts, or hydroxides of polyvalent metals, such as calcium chloride, barium chloride, magnesium chloride, zinc chloride, zinc sulphate, ferrous sulphate, barium hydroxide, calcium hydroxide, chromium acetate, chromealum, copper acetate and aluminum salts such as aluminum sulphate may be used. The aforementioned cross-linking agents derived from polyvalent metals react with the acid groups of the copolymers with the formation of salts, whereby said agents effect a cross-linkage of the copolymers by way of the salt groups formed. If it is to be understood that the polyamines may also be applied in form of their salts with weak organic and inorganic acids such as carbonic acid, acetic acid, benzoic acid, stearic acid, and boric acid. In case that polyamines with primary or secondary amino groups or their salts are used as cross-linking agents the salt groups formed during reaction with the reactive groups of the polymers are transformed into carbonamide or carbonimide groups during the drying process which follows the cross-linking step. Other suitable cross-linking agents are organic compounds containing at least two epoxy groups such as di-glycidyl trimethylol-propane obtained by reaction of 1 mol of tri-methylolpropane with 2 mols of epichlorhydrine, di-glycidyl-glycerin obtained by reaction of 1 mol of glycerin with 2 mols of epichlorhydrine, di-glycidyl diphenylol-propane obtained by reacting 1 mol of di-p-hydroxy-phenyl-dimethylmethane with 2 mols of epichlorhydrine, and di-glycidyl anilide. These polyepoxy compounds are preferably applied in alcoholic solution. For accelerating the reaction of the epoxy groups with the carboxyl groups of the polymers, whereby polyester formation occurs, the polymer after contacting said polyepoxy compounds is aftertreated with alkaline agents such as aqueous solutions of alkali metal hydroxides, alkaline-earth metal hydroxides, ammonia, and organic amines, such as di-butylamine, trimethylamine, and triethylamine. The copolymers containing carbonamide groups may be reacted with aliphatic and aromatic aldehydes such as acetaldehyde, propionaldehyde, butyraldehyde, glyoxal, benzaldehyde, preferably formaldehyde, its different polymeric modifications or compounds thereof yielding formaldehyde, such as hexamethylene tetramine, rongalite, or compounds containing several reactive methylol compounds, such as hexamethylol melamine and dimethylol urea. Polybasic organic acids, such as oxalic acid, itaconic acid, fumaric acid, maleic acid, succinic acid, glutaconic acid, citric acid, adipic acid, tartaric acid, 1,5-naphthalene disulfonic acid, and 1,3-benzene-disulphonic acid may be considered in respect of the copolymers containing basic groups.

As to the composition of the coagulating baths containing preferably water or alcohols such as methanol or ethanol, mixtures of water with alcohols may be used as solvents or as emulsion medium, although the invention is not restricted to the use of such solvents. The amount of cross-linking agents applied may vary within wide limits. Preferably, amounts of a cross-linking agent should be utilized sufficient to react with at least $\frac{1}{10}$ of the reactive groups. Good results are also obtained if the amount of cross-linking agents is at least chemically equivalent to the reactive groups present in the polymer. For achieving this result the coagulating bath should preferably contain 1-50 percent by weight of cross-linking agent, although higher concentrations are also applicable. Besides the cross-linking agents, the coagulating bath may contain coagulating agents as for instance strong electrolytes such as sodium chloride, potassium chloride, sodium sulphate, calcium chloride, zinc chloride, magnesium chloride in amounts of about 1-30 percent by weight. The pH-value of the coagulating bath depends on the type of reaction by which cross-linking of the polymers is effected. In case that polymers with carboxylic or sulphonic acid groups are used the pH-value is preferably kept at about 6-10 if polyamines and their salts and/or hydroxides of polyvalent metals are applied as cross-linking agents. The salts of the polyvalent metals require a pH-value of about 4-7. With mixtures of polyvalent metals and polyamines the pH-value may be kept at about 6-10. For the reaction of the polymers with carbonyl groups the coagulating bath should contain polyamines in the aforementioned concentrations. The pH-value of said coagulating bath is kept at about 7-10. When polymers with carbonamide groups are used the coagulating bath contains aldehydes and may have a pH-value of about 6-10.

The emulsion or solution of the polymer may also contain thickening agents such as polyvinylalcohol, salts of polyacrylic acid, alginic acid, carboxymethyl cellulose which are soluble in water or alcohol, casein, gelatine, tragacanth, agar-agar, or other synthetic thickening agents in a concentration of about 1-15 percent by weight.

The temperature of the coagulating bath depends on the reactivity of the components applied. Generally speaking, it may be kept at temperatures of about 20-70° C.

The copolymer emulsions or solutions which have been described may of course also have added thereto other natural or synthetic rubber lattices or plastic emulsions, fillers, plasticizers, resins, dyestuffs, pigments, solvents, or other high molecular weight polymers capable of being cross-linked in accordance with the same principle. Examples of such high polymers are polyacrylic acids, carboxy methyl cellulose alginic acid, protein compounds such as casein, furthermore polyesters, etc.

In carrying out the process of the invention molds are for instance dipped into the coagulation bath and then into the copolymer emulsion or solution. According to a preferred embodiment of the invention, the molding thus obtained is treated once more with the coagulating bath. After washing and drying, an elastic molding is obtained. The treatment of the mold with the coagulating bath and the polymer emulsion or solution can be repeated several times whereby surprisingly the individual coatings thus formed are excellently bonded to one another to form a uniform, more or less thick-walled molding after drying or heating up to about 70-130° C. In this manner, for instance tubes, pipes and other shaped articles, can be produced.

According to another embodiment of the invention the mold is dipped first into the copolymer emulsion or solution and subsequently into the coagulating bath. According to a specific embodiment of the invention the inside walls of a mold are coated with elasticizing emulsion. To this end the inner walls in the mold are repeatedly treated with the coagulation bath and the polymer emulsion or solution. The further treatment corresponds to the method above with respect of the production of dipping goods. After drying the moldings produced by this specific embodiment of the invention show excellent strength properties which can be influenced by the drying temperature and the time of reaction. Since the above described cross-linking agents allow to produce, besides salts, homopolar bonds with the acid groups, this embodiment of the invention offers the possibility of increasing in many cases the technological properties after heating for a longer or shorter period of time. As far as butadiene polymers are used it is feasible to add to the emulsion conventional vulcanizing agents, for instance sulfur, and accelerators and to effect additional vulcanization by heating. Besides, the usually employed zinc salts may be incorporated into the polymer emulsions or solutions, however, it has to be taken into consideration that polymers containing acid groups are stable only for a limited period of time. To remove this disadvantage the zinc salt is dissolved in the coagulation bath.

It is a specific feature of the invention that dipping goods with excellent strength properties can be obtained by a simple drying step without such vulcanization process. This result is all the more surprising, since, up to the present, vulcanizates valuable for a large scale production could generally not be obtained from polymers containing butadiene without addition of fillers by means of the usual vulcanization using sulfur and accelerator according to the dipping process. Besides, the invention allows using the emulsions of the herein disclosed polymers at such low concentration that it is possible to produce thin-walled articles with a wall-thickness of 0.08–0.15 mm.

The invention is further illustrated by the following examples without being restricted thereto, the parts given being by weight.

*Example 1*

5,500 parts of butadiene, 3,500 parts of acrylonitrile, 1,000 parts of maleic acid monobutyl ester are emulsified in 13,400 parts of a solution of 400 parts of sodium salt of the paraffin sulfonic acid having about 12–18 carbon atoms in 13,000 parts of water and 300 parts of n/1-sulfonic acid and polymerized while stirring at 25° C. after addition of 16.3 parts of diisopropyl xanthogene disulfide and 50 parts of the sodium salt of a paraffin sulfinic acid with 12–18 carbon atoms. 48.9 parts of diisopropyl xanthogene disulfide are additionally supplied in 3 batches each of 16.3 parts, when 25, 40 and 55 percent of the monomers are polymerized. After 26 hours 80 percent of the monomers are polymerized. The reaction is stopped by addition of 100 parts of sodium hydrosulfite, 3 percent (calculated on the monomers applied) of the usual stabilizer, for instance phenyl-β-naphthyl amine, and the mixture is degasified by steam distillation. The emulsion so obtained can be used directly to produce dipping goods. The mold to be used is degreased and pretreated by dipping into the solution of 120 parts of ethylene diamine and 350 parts of calcium chloride in 3,500 parts of water. Presently the mold thus pretreated is briefly dipped into the above described emulsion. After lifting the mold from the emulsion a coagulation coating has formed on the mold which is subsequently treated once more with the ethylene diamine calcium chloride solution. After washing and drying by recirculating air in a drying chamber at 80° C. a dipping article is obtained which is resistant to solvents and heat and shows a tensile strength of 350 kg./cm.² at an elongation at break of 660 percent. The aforedescribed dipping process can be repeated prior to the drying step as often as desired so that for instance after 12 times repetition a dipping article having a wall-thickness of 3 mm. is obtained. The superposed coagulation layers are completely welded upon being dried.

*Example 2*

1,800 parts of butadiene, 900 parts of styrene, and 300 parts of maleic acid monocyclohexylester are emulsified in 4,000 parts of a solution of 105 parts of a sodium salt of a paraffin sulfonic acid with about 12–18 carbon atoms in 3,895 parts of water and 90 parts of n/1-sulfuric acid and polymerized while stirring at 40° C. with addition of 7.5 parts of n-dodecyl mercaptan and 15 parts of the sodium salt of a paraffin sulfinic acid with 12–19 carbon atoms. After 20 hours 60 percent of the monomers are polymerized. The reaction is stopped by addition of 30 parts of sodium hydrosulfite and stabilized with 60 parts of phenyl-β-naphthyl amine. By the dipping process described in Example 1 the degasified emulsion yields dipping goods of any desired wall thickness with excellent strength properties.

*Example 3*

1,125 parts of acrylic acid butyl ester, 225 parts of acrylonitrile and 150 parts of methacrylic acid are emulsified in 1,600 parts of a solution of 50 parts of the sodium salt of a paraffin sulfonic acid with about 12–18 carbon atoms in 1,550 parts of water and 30 parts n/1-sulfuric acid, and polymerized while stirring at 25° C. with the addition of 7.5 parts of the sodium salt of a paraffin sulfinic acid with about 12–18 carbon atoms. After 4 hours almost 100 percent of the monomers are polymerized. The dipping goods prepared with this emulsion according to Example 1 show good strength properties and excellent resistance to ageing.

*Example 4*

A polymerization emulsion is prepared as described in Example 1 and reacted with 2% (calculated on the solid substance) of 2,2'-methylene-bis-(4-methyl-6-cyclohexyl phenol) instead of phenyl-β-naphthyl-amine. After degasification 60 parts of a suspension of 100 parts of zinc oxide in 100 parts of a 10 percent solution of a condensation product of β-naphthalene sulfonic acid and formaldehyde are added to the latex with stirring. By pretreatment and after-treatment of the mold with a 10 percent calcium chloride solution according to Example 1 the latex-zinc-oxide-suspension thus obtained yields white light-resistant dipping goods showing a high resistance to heat and oil.

*Example 5*

A solution of 30 parts of monoethanol amine and 70 parts of calcium chloride in 700 parts of water is prepared. After degreasing a mold is treated with this solution and then dipped into the latex described in Example 2. Briefly after treating with the monoethanol amine calcium chloride solution, washing and drying, a very soft and resilient dipping article is obtained. The strength properties of the article can be substantially improved by heating to 120° C.

*Example 6*

1,050 parts of butadiene, 375 parts of acrylonitrile and 75 parts of methacrylic acid are emulsified in the autoclave in 2,250 parts of a solution of 225 parts of the sodium salt of a paraffin sulfonic acid with about 12–18 carbon atoms in 2,025 parts of water. Another quantity of 3.75 parts of n-dodecyl mercaptan are added and 7.5 parts of the sodium salt of a paraffin sulfinic acid with about 12–18 carbon atoms, dissolved in 50 parts of water, are introduced under pressure. The reaction mixture is heated to 20° C. with stirring; after 24.5 hours a yield of 80.3 percent is obtained. The reaction is stopped by addition of a solution of 15 parts of sodium hydrosulfite in 300 parts of water and stabilized by introducing while stirring a solution of 30 parts of phenyl-β-naphthyl-amine in 100 parts of methyl alcohol. By liberating the emulsion from the residual monomers by steam distillation a 32 percent latex is obtained which can be used for producing dipping goods. For this purpose a degreased mold is dipped into a solution of 24 parts of ethylene diamine and 30 parts of calcium chloride in 600 parts of ethyl alcohol. After taking out the mold from the solution and briefly dripping off, the mold is dipped into the aforedescribed emulsion. After taking out the mold from the emulsion a completely smooth coagulation film has formed on the mold, which is resistant to mechanical stresses. The film is dried by heating to 120° C. for 45 minutes and is then ready for use. The dipping article is fast to gasoline and shows a tensile strength of 570 kg./cm.$^2$ at an elongation at break of 680 percent.

*Example 7*

1,125 parts of butadiene, 226.5 parts of styrene, 75 parts of maleic acid monobutylester and 37.5 parts of methacrylic acid are emulsified and polymerized as described in Example 6. After 14 hours a yield of 78.8 percent is obtained. After working up as described in the foregoing example, dipping goods can be obtained with a coagulation bath containing 26 parts of ethylene diamine and 40 parts of calcium chloride in 600 parts of ethyl alcohol. The highly elastic dipping goods have a tensile strength of 463 kg./cm.$^2$ at an elongation at break of 730 percent.

*Example 8*

The emulsion of Example 7 is used to produce dipping goods in combination with a coagulation bath containing 36 parts of trimethylolpropane diepoxide and 40 parts of calcium chloride, dissolved in 600 parts of ethyl alcohol. The dipping goods thus obtained have a tensile strength of 281 kg./cm.$^2$ at an elongation at break of 710 percent.

*Example 9*

3 parts of sulfur and 3 parts of the zinc salt of dithiocarbamic acid, 5 parts of zinc oxide and 10 parts of a condensation product of naphthalene sulfonic acid and formaldehyde are suspended in 100 parts of water. 22 parts of the suspension are stirred into 600 parts of the latex described in Example 6 and used to produce dipping goods in combination with a coagulation bath containing 40 parts of calcium chloride dissolved in 600 parts of ethyl alcohol. The dipping goods obtained show a tensile strength of 405 kg./cm.$^2$ at an elongation at break of 485 percent.

*Example 10*

In a turbomixer 3 parts of sulfur, 3 parts of the zinc salt of diethyl dithiocarbamic acid and 10 parts of a condensation product of naphthalene sulfonic acid and formaldehyde are suspended in 100 parts of water. 22 parts of the suspension are stirred into 600 parts of the latex described in Example 6 and used to produce dipping goods in combination with a coagulation bath containing 20 parts of calcium chloride and 30 parts of zinc chloride, dissolved in 600 parts of ethyl alcohol. The dipping goods obtained show a tensile strength of 337 kg./cm.$^2$ at an elongation at break of 520 percent.

*Example 11*

1,400 parts of butadiene, 500 parts of acrylonitrile and 100 parts of vinylmethyl ketone are emulsified in 2,160 parts of water with the addition of 400 parts of a 10 percent solution of the sodium salt of a paraffin sulfonic acid with about 12–18 carbon atoms, and 40 parts of n/1-sulfuric acid. Polymerization is initiated by addition of 8 parts of the sodium salt of a paraffin sulfinic acid with about 12–18 carbon atoms. As regulators 6 parts of n-dodecyl mercaptan are added in two portions during polymerization. At a temperature of 25° C. a yield of 80 percent is obtained within 28 hours. The reaction is stopped by addition of 6 parts of hydroquinone dissolved in little alcohol and the latex stabilized with 3 percent by weight of phenyl-β-naphthyl amine, calculated on the monomers. The emulsion is then liberated from the residual monomers by steam distillation and used to produce dipping goods in combination with a coagulation bath containing 55 parts of ethylene diamine and 35 parts of calcium chloride, dissolved in 600 parts of ethyl alcohol. The dipping goods obtained show a tensile strength of 275 kg./cm.$^2$ at an elongation at break of 460 percent.

*Example 12*

1,400 parts of butadiene, 500 parts of acrylonitrile and 100 parts of α-methyl acrolein are emulsified as described in Example 11, polymerized and worked up. The coagulation bath used to produce dipping goods contains 37 parts of ethylene diamine and 40 parts of calcium chloride, dissolved in 600 parts of ethyl alcohol. The dipping goods obtained, after being dried at 120° C. for 45 minutes, show a tensile strength of 312 kg./cm.$^2$ at an elongation at break of 420 percent.

*Examples 13–19*

The emulsion described in Example 6 is used to produce dipping goods together with a coagulation bath of varying composition. The table below indicates the composition of the coagulation baths as well as the physical data of the dipping goods produced with the emulsion of Example 6.

| Examples | 13 | 14 | 15 | 16 | 17 | 18 | 19 |
|---|---|---|---|---|---|---|---|
| ethyl alcohol in parts | 600 | ---- | 600 | 600 | 600 | 600 | 600 |
| water in parts | ---- | 600 | ---- | ---- | ---- | ---- | ---- |
| calcium chloride in parts | 60 | ---- | 30 | 35 | 40 | 40 | 40 |
| barium chloride in parts | ---- | 50 | ---- | ---- | ---- | ---- | ---- |
| barium hydroxide in parts | ---- | 20 | ---- | ---- | ---- | ---- | ---- |
| diethylenetriamine in parts | ---- | ---- | 20 | ---- | ---- | ---- | ---- |
| triethylene tetramine in parts | ---- | ---- | ---- | 22 | ---- | ---- | ---- |
| N,N'-dimethylethylene diamine in parts | ---- | ---- | ---- | ---- | 32 | ---- | ---- |
| N,N,N',N'-tetramethylethylene diamine in parts | ---- | ---- | ---- | ---- | ---- | 40 | ---- |
| glycerine diepoxide in parts | ---- | ---- | ---- | ---- | ---- | ---- | 55 |
| Tensile strength, kg./cm.$^2$ | 232 | 172 | 470 | 512 | 330 | 278 | 285 |
| Elongation at break, percent | 560 | 540 | 630 | 610 | 680 | 610 | 540 |

*Example 20*

1,050 parts of butadiene, 300 parts of styrene and 150 parts of methacrylamide are emulsified with the addition of 2 parts of sodium hydroxide solution, 2 parts of diisoproply xanthogen disulfide and 60 parts of sodium salt of a paraffin sulfonic acid with 12–18 carbon atoms in about 1,975 parts of water. 2 parts of potassium persulfate and 1 part of triethanolamine, dissolved in 200 parts of water, are introduced under pressure into the autoclave and the mixture is heated to 35° C. with stirring. After 43 hours a yield of 80 percent is obtained. The reaction is stopped by addition of 15 parts of sodium hydrosulfite, dissolved in 300 parts of water, the latex is stabilized with 2 percent by weight of phenyl-β-naphthyl amine, calculated on the monomers, and the mixture is degasified by steam distillation. The coagulation bath used to produce dipping goods has the following composition: 45 parts of hexamethylene diamine and 30 parts of calcium chloride are dissolved in 600 parts of ethyl alcohol. The dipping goods obtained as described in the preceding examples show a tensile strength of 212 kg./cm.$^2$ at an elongation at break of 460 percent.

*Example 21*

700 parts of acrylic acid butyl ester and 300 parts of methacrylic acid methyl ester are emulsified in 1,200 parts of a solution of 35 parts of a sodium salt of a paraffin sulfonic acid with about 12–18 carbon atoms in 1,100 parts of water and 20 parts of n/1-sulfuric acid and polymerized with the addition of 7.5 parts of a sodium salt of a paraffin sulfinic acid with about 12 to 18 carbon atoms at 30° C. with stirring. After 6 hours almost 100 percent of the monomers are polymerized. 2,500 parts of this emulsion are slowly mixed while stirring with 700 parts of a 10 percent aqueous sodium hydroxide solution and stirred at 50° C. for 5 hours. Thereupon the emulsion is mixed while cooling with 50 parts of a polyglycol ether of lauryl alcohol and acidified with dilute sulfuric acid to pH 4. Dipping goods produced with this emulsion in combination with a coagulation bath containing 26 parts of ethylene diamine and 35 parts of calcium chloride, dissolved in 600 parts of ethyl alcohol, show a tensile strength of 375 kg./cm.² at an elongation at break of 520 percent.

*Example 22*

7,000 parts of butadiene, 2,500 parts of styrene, and 500 parts of 2-vinyl pyridine are emulsified in 10,500 parts of a solution of 250 parts of sodium salt of a paraffin sulfonic acid with about 12–18 carbon atoms in 10,250 parts of water and polymerized with the addition of 60 parts of n-dodecyl mercaptan and 50 parts of potassium persulfate at 50° C. with stirring. After 53 hours a yield of 76.7 percent is obtained. The reaction is stopped, stabilized and worked up as described in Example 6. The coagulation bath contains 3 parts of sodium chloride, 2 parts of 32 percent hydrochloric acid, 5 parts of trisodium phosphate, 30 parts of calcium chloride and 18 parts of malonic acid, dissolved in 600 parts of water. Dipping goods produced as described in the preceding examples show a tensile strength of 202 kg./cm.² at an elongation at break of 680 percent.

What is claimed is:

1. A process for the production of moldings which comprises depositing on a molding form a layer of a cross-linking agent selected from the group consisting of an aliphatic polyamine, an aliphatic polyamide, a polyglycidyl ether of an organic polyhydroxy compound, and a tertiary amine containing at least two epoxy groups, applying thereover a continuous coating of an aqueous emulsion of a rubbery copolymer consisting essentially of a linear carbon chain to which are linked from 0.005 to 0.6 mol by weight of carboxyl groups per 100 parts by weight of rubbery copolymer, and drying said continuous coating at elevated temperature, whereby a cross-linked copolymer is formed by the reaction between the acid groups of the copolymer and the vulcanizing agent.

2. The process of claim 1 wherein said rubbery copolymer is a binary copolymer of (1) 15 to 99% by weight, based on the weight of the copolymer, of a monomer selected from the group consisting of a conjugated diolefin of 4 to 6 carbon atoms, an ester of acrylic acid with a saturated aliphatic alcohol having at least 4 carbon atoms, and an ester of methacrylic acid with a saturated aliphatic alcohol having at least 4 carbon atoms, and (2) 0.5 to 50% by weight, based on the weight of the copolymer, of a mono-ethylenically unsaturated monomer containing a carboxylic acid group.

3. The process of claim 1 wherein said rubbery copolymer is a terpolymer of (1) 15 to 99% by weight, based on the weight of the terpolymer, of a monomer selected from the group consisting of a conjugated diolefin of 4 to 6 carbon atoms, an ester of acrylic acid with a saturated aliphatic alcohol having at least 4 carbon atoms, and an ester of methacrylic acid with a saturated aliphatic alcohol having at least 4 carbon atoms, (2) 0.5 to 50% by weight, based on the weight of the terpolymer, of a mono-ethylenically unsaturated monomer containing a carboxylic acid group, and (3) a further ethylenically unsaturated monomer selected from the group consisting of styrene, acrylonitrile, methacrylonitrile, vinyl chloride, 1,1-dichloroethene, an ester of acrylic acid with a saturated aliphatic alcohol of 1 to 3 carbon atoms, and an ester of methacrylic acid with a saturated aliphatic alcohol of 1 to 3 carbon atoms.

4. The process of claim 3 wherein said copolymer is a terpolymer of butadiene, a half ester of an alpha-beta-monoethylenically unsaturated dicarboxylic acid, and acrylonitrile.

5. The process of claim 3 wherein said copolymer is a terpolymer of butadiene, a half ester of an alpha-beta-monoethylenically unsaturated dicarboxylic acid, and styrene.

6. The process of claim 3 wherein said copolymer is a terpolymer of butadiene, an alpha-beta-ethylenically unsaturated carboxylic acid, and styrene.

7. The process of claim 3 wherein said copolymer is a terpolymer of butyl acetate, methacrylic acid, and acrylonitrile.

8. The process of claim 3 wherein said copolymer is a terpolymer of butadiene, monobutyl maleate, and acrylonitrile.

9. The process of claim 3 wherein said copolymer is a terpolymer of butadiene, monobutyl maleate, and styrene.

10. The process of claim 3 wherein said copolymer is a terpolymer of butadiene, monododecyl maleate, and acrylonitrile.

11. The process of claim 3 wherein said copolymer is a terpolymer of butadiene, methacrylic acid, and acrylonitrile.

12. The process of claim 3 wherein said copolymer is a terpolymer of butadiene, methacrylic acid, and styrene.

References Cited in the file of this patent

UNITED STATES PATENTS

| Number | Name | Date |
|---|---|---|
| 1,894,629 | Murphy et al. | Jan. 17, 1933 |
| 2,006,862 | Hansen et al. | July 2, 1935 |
| 2,130,523 | Carothers | Sept. 20, 1938 |
| 2,132,502 | Watkins | Oct. 11, 1938 |
| 2,162,618 | Izard | June 13, 1939 |
| 2,525,272 | Rhoton | Oct. 10, 1950 |
| 2,569,932 | Izard | Oct. 2, 1951 |
| 2,710,292 | Brown | June 7, 1953 |
| 2,814,834 | Hess et al. | Dec. 3, 1957 |